US009841434B2

(12) United States Patent
Sonderegger et al.

(10) Patent No.: US 9,841,434 B2
(45) Date of Patent: Dec. 12, 2017

(54) METHOD FOR PRODUCING AN ACCELERATION SENSOR

(71) Applicant: KISTLER HOLDING AG, Winterthur (CH)

(72) Inventors: Christof Sonderegger, Neftenbach (CH); Peter Charles Tack, Lancaster, NY (US)

(73) Assignee: KISTLER HOLDING AG, Winterthur (CH)

( * ) Notice: Subject to any disclaimer, the term of this patent is extended or adjusted under 35 U.S.C. 154(b) by 12 days.

(21) Appl. No.: 14/766,566

(22) PCT Filed: Feb. 6, 2014

(86) PCT No.: PCT/CH2014/000015
§ 371 (c)(1),
(2) Date: Aug. 7, 2015

(87) PCT Pub. No.: WO2014/121407
PCT Pub. Date: Aug. 14, 2014

(65) Prior Publication Data
US 2016/0003864 A1 Jan. 7, 2016

(30) Foreign Application Priority Data

Feb. 7, 2013 (CH) .......................................... 411/13
Mar. 13, 2013 (CH) .......................................... 594/13

(51) Int. Cl.
*G01P 1/02* (2006.01)
*G01P 15/09* (2006.01)
(Continued)

(52) U.S. Cl.
CPC ........ *G01P 15/0802* (2013.01); *B23K 11/087* (2013.01); *B23K 11/20* (2013.01);
(Continued)

(58) Field of Classification Search
CPC ... G01P 1/023; G01P 15/18; G01P 2015/0854
See application file for complete search history.

(56) References Cited

U.S. PATENT DOCUMENTS 3,093,759 A * 6/1963 Orlacchio ........... G01P 15/0922
310/329
4,359,658 A * 11/1982 Cartier ................ G01P 15/0907
310/329
(Continued)

FOREIGN PATENT DOCUMENTS

GB 1 393 312 5/1975

OTHER PUBLICATIONS

International Preliminary Report on Patentability for PCT/CH2014/000015 dated Aug. 11, 2015.
(Continued)

*Primary Examiner* — Matthew G Marini
*Assistant Examiner* — Ruben Parco, Jr.
(74) *Attorney, Agent, or Firm* — Dority & Manning, P.A.

(57) ABSTRACT

The invention relates to a method for producing an acceleration sensor having a housing (1), which has a cylindrical or cubic basic shape, having at least one internal support (4) and having a sensor element (2) arranged thereon. According to the invention a sensor element (2) comprising a main body (29) having a head part (21) and an end face (24) opposing said head part (21) is premounted, by surrounding the head part (21) with at least one piezoelectric measuring element (23), a seismic composition (22) and a clamping ring (27). The end face (24) is subsequently positioned on the inner support (4) of the housing (1) in contact therewith to form a contact zone (7) between the end face (24) and the support (4). Finally, the sensor element (2) is welded in this contact zone (7) to the housing (1). The invention further relates to an acceleration sensor produced using said method.

13 Claims, 3 Drawing Sheets

(51) Int. Cl.
  *G01P 15/08* (2006.01)
  *B23K 11/087* (2006.01)
  *B23K 11/20* (2006.01)
  *B23K 20/12* (2006.01)
  *B23K 20/227* (2006.01)
  *B23K 20/233* (2006.01)

(52) U.S. Cl.
  CPC .......... *B23K 20/12* (2013.01); *B23K 20/2275* (2013.01); *B23K 20/2333* (2013.01); *G01P 1/023* (2013.01); *G01P 15/09* (2013.01)

(56) References Cited

U.S. PATENT DOCUMENTS

| | | | | |
|---|---|---|---|---|
| 4,771,637 A | * | 9/1988 | Kubler | G01P 1/023 73/493 |
| 5,124,938 A | * | 6/1992 | Algrain | B64G 1/22 248/550 |
| 5,224,380 A | | 7/1993 | Paik | |
| 5,782,575 A | * | 7/1998 | Vincent | A61M 5/152 156/580.2 |
| 6,279,395 B1 | * | 8/2001 | Insalaco | G01L 1/16 310/329 |
| 2004/0144758 A1 | | 7/2004 | Onishi | |
| 2004/0201464 A1 | * | 10/2004 | Oonishi | B60R 21/013 340/436 |
| 2005/0193801 A1 | | 9/2005 | Simonenko et al. | |
| 2006/0134825 A1 | * | 6/2006 | DCamp | B81B 7/0038 438/106 |

OTHER PUBLICATIONS

International Search Report, dated Mar. 27, 2014.
English translation of Chinese First Office Action, dated May 3, 2017.

\* cited by examiner

METHOD FOR PRODUCING AN ACCELERATION SENSOR

CROSS-REFERENCE TO RELATED APPLICATIONS

This application claims priority to International Application Serial No. PCT/CH2014/000015, filed Feb. 6, 2014, which claims priority to Swiss Application Nos. 411/13, filed Feb. 7, 2013, and 594/13, filed Mar. 13, 2013. International Application Serial No. PCT/CH2014/000015 is hereby incorporated herein in its entirety for all purposes by this reference.

FIELD OF THE INVENTION

The invention relates to a method for producing an acceleration sensor for use in machines, systems, vehicles or aircraft, wherein the finished acceleration sensor comprises a housing, which is cylindrical or cubic in terms of its basic shape, with at least one internal support with a sensor element arranged thereon. It furthermore relates to an acceleration sensor of this type, particularly an acceleration sensor for measuring acceleration values in one or in three axes.

BACKGROUND

Pressure or force sensors are often exposed to various forces or moments at the same time in different axial directions and a plurality of components should be measured, depending on the use case. In this case, each force component must be detectable independently of other forces or moments. To this end, a sensor comprises a plurality of measuring bodies with one or a plurality of measuring elements, as required.

Acceleration sensors are known and come to be used in diverse fields of use. They may only have a small size and dead weight, which can lead to expensive assembly and corresponding delivery terms in the case of triaxially acting sensors in particular. Thus, in a small space, accommodation chambers are milled into a sensor housing, which must additionally accommodate threaded holes for the fastening of the acceleration sensor on a substrate or a base and the sensor elements must be embedded into a seismic mass and built into a very narrow space. As a consequence of the demand for ever smaller sensors, the sensitive sensor elements cannot be preassembled and installed on this base.

BRIEF SUMMARY OF THE INVENTION

The invention is therefore based on the object of creating a method described at the beginning for producing an acceleration sensor, which enables a simpler and flexible assembly of sensors of this type.

The object is achieved with the features that are described below.

The invention relates to a method for producing an acceleration sensor with a housing, which is cylindrical or cubic in terms of its basic shape, with at least one internal support and with a sensor element arranged thereon. According to the invention, a sensor element comprising a base body with head part and end face opposite the head part is pre-installed, in that the head part is encompassed with at least one piezoelectric measuring element and also with a seismic mass and a clamping ring, wherein the clamping ring and seismic mass can be configured in a body with combined properties. Subsequently, the end face is positioned contacting the inner support of the housing for forming a contact zone between the end face and the support. Finally, the sensor element is welded in this contact zone with the housing.

The invention also relates to an acceleration sensor for measuring acceleration values in one axis or three axes, wherein the acceleration sensor comprises a housing, which is essentially cylindrical or cubic in terms of its basic shape, with one internal support or three internal supports, each internal support being accessible from outside the housing, and a sensor arranged on each internal support and including a base body (20). According to the invention, an end face of each base body of each sensor element is arranged in a materially-bonded manner on one of the internal supports at a contact zone by means of welding.

In a first step of the method according to the invention, the sensor element is pre-installed by encompassing a head part of a base body with at least one piezoelectric measuring element and subsequently by enclosing the base body and the measuring element with a seismic mass and with a clamping ring. Clamping ring and seismic mass can be configured in a body with combined properties. Preferably, the acceleration sensor has three piezoelectric measuring elements, which are arranged in a distributed manner around the base body and enclosed together by the seismic mass and the clamping ring. The acceleration sensor can however only contain one measuring element.

In a second step, an end face of the base body opposite the head part is positioned contacting an internal support of the housing for forming a contact zone between the end face and the internal support.

Subsequently, the end face of the pre-installed sensor element is ultimately welded on the internal support of the housing to construct a materially-bonded connection at the contact zone.

In a preferred form of the method, a welding electrode is applied with a defined force on the head part of the sensor element, wherein the welding electrode is connected to a system for resistance welding. By applying a defined welding voltage between the welding electrode and a counter electrode on the housing, a current flow is generated through the base body with the head part and the housing, which effects an at least partial melting of the end face and the internal support in the contact zone, so that an annular, materially-bonded connection is produced.

As a result, a precise and planarly orientated connection is achieved, which can be produced quickly and also enables a further area reduction. Surrounding regions of the support or the housing are not impaired, as only a very slight temperature increase results due to the low energy.

A further object consists in the provision of an acceleration sensor, particularly an acceleration sensor for measuring acceleration values in one or in three axes, which has a modular construction.

This object is achieved with the features described herein. The acceleration sensor according to the invention comprises a housing, which is essentially cylindrical or cubic in terms of its basic shape, with internal supports, which are accessible from outside the housing, and sensor elements, which have a base body, arranged on the internal supports. According to the invention, an end face of each base body of each sensor element is arranged in a materially-bonded manner on one of the internal supports at a contact zone by means of welding. This welding preferably takes place by resistance welding.

The modular construction enables the use of different sensor elements for different measuring regions in a housing in only one size. The housing should be as small as possible, so that the fields of application and use can be kept as flexible as possible.

The production method according to the invention enables a simple and mass-produced pre-installation and storage of sensor elements and the fast, precise and cost-effective installation thereof in the sensor housing. Thus, the throughput times are kept short, as a result of which a short-term provision of acceleration sensors is enabled.

BRIEF DESCRIPTION OF THE DRAWINGS

The invention is described in more detail in exemplary embodiments in accordance with the following drawings.

DESCRIPTION OF EXEMPLARY EMBODIMENTS OF THE INVENTION

Figure 1A:
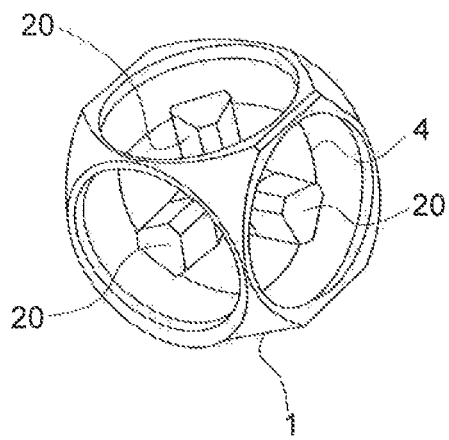
FIG. 1a: shows a housing of an acceleration sensor of previous design without mounted sensor elements.
Figure 1B:
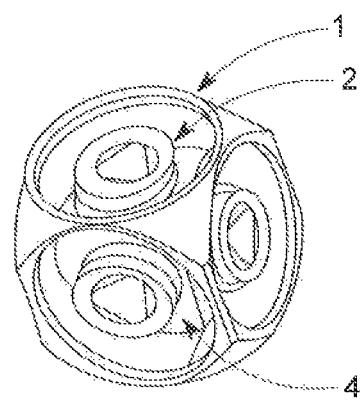
FIG. 1b: shows an acceleration sensor according to the invention.

FIG. 1a shows a housing of an acceleration sensor according to the prior art, which is milled from one part. Three base bodies 20 without sensor elements are illustrated in a cubic housing 1, which base bodies were likewise milled out.

Each sensor element 2 is first installed completely in the housing 1, which is difficult and time-consuming in the case of a visibly small interior of the housing 1. It is in this case foreseeable that the housings will become even smaller in the future, for which reason the milling is also made more difficult.

Figure 4:
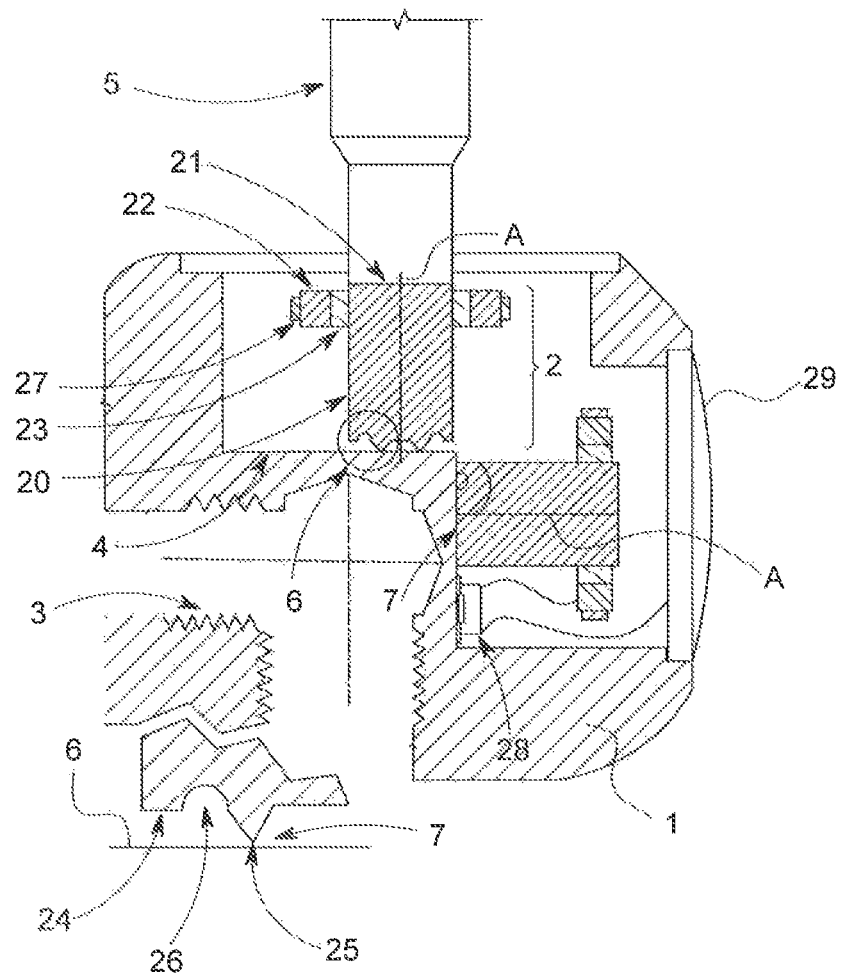
FIG. 4: shows an arrangement for producing an acceleration sensor.

It can be seen from FIG. 4 that installation threads 3 for attaching the acceleration sensor are arranged externally on the housing 1. As a result, the internal supports 4 for accommodating the sensor elements 2, which are opposite the installation threads 3, cannot be enlarged. The wall thickness in this region, which turns out to be very low, is problematic. Therefore, the sensor elements 2 cannot be screwed into the housing 1, because the wall thickness is too low for a threaded hole.

The internal supports 4 enable a smaller size of the housing 1 and a protected arrangement of sensor element 2, measuring electronics and wiring, compared to an external arrangement, however.

According to the invention, the housing 1 of the acceleration sensor consists of a titanium or aluminium material.

Figure 2:
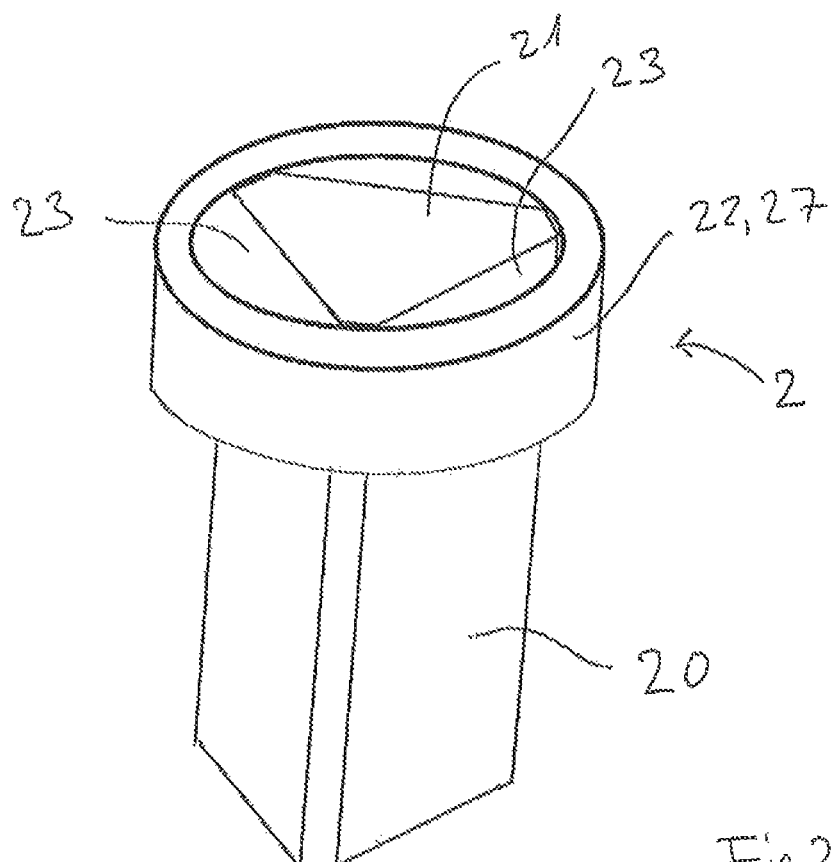
FIG. 2: shows a pre-installed sensor element according to the invention.
Figure 3:
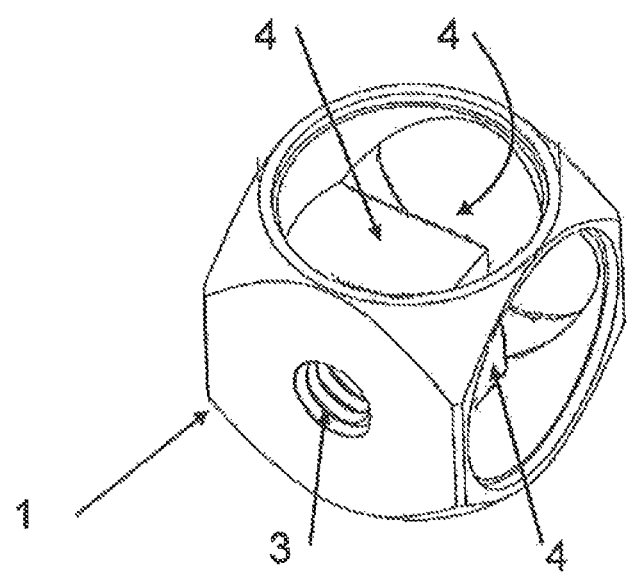
FIG. 3: shows a housing with specification of the supply directions of the pre-installed sensor elements.

The sensor element 2 (FIG. 2) itself preferably comprises a base body 20 made from titanium or steel, in order to ensure a high rigidity. The base body 20 is provided with a preferably round or polygonal head part 21. As shown in FIG. 4, the head part 21 is encompassed by a seismic mass 22, which is in turn enclosed by a clamping ring 27, preferably in the form of a shrink ring. Clamping ring 27 and seismic mass 22 can be configured in a body with combined properties. One or a plurality of piezoelectric elements 23 are arranged in the arc-shaped recesses between seismic mass 22 and head part 21. An end face 24 of the base body 20, which is to be placed on the support 4 and facing away from the head part 21, is preferably provided with an annular elevation 25, which is outwardly surrounded by a groove 26. An externally arranged groove 26 enables a larger volume for complete accommodation of melt and therefore a qualitatively good connection for small diameters of the base body 20.

The sensor element 2 can be configured in a pin-shaped manner. As schematically shown in FIG. 4, a sensor element 2 of the above-described type with an axis A transverse to the end face 24, which has an axial space between the end face 24 and each piezoelectric element 23, the seismic mass 22 and also the clamping ring 27, is valid as a pin in the sense of the invention. In each case, the axis A corresponds to one of the sensor axes to be measured.

For installing a pre-installed sensor element 2 in the housing 1, as described previously, as mentioned previously, the end face 24 of a sensor element 2 is positioned parallel to the jointing surface 6 of the support 4 (FIG. 4), wherein only the tips of the elevation 25 contact the jointing surface 6 and form a conductive contact zone 7 in the process.

Subsequently, a welding electrode 5 is applied on the head part 21 conductively with a defined force, wherein the welding electrode 5 is connected with a system, which is not illustrated, for resistance welding. By applying a defined welding voltage, a current flow is generated through the welding electrode 5, the base body 20 with head part 21 and the housing 1 and also a counter electrode, which effects an at least partial melting of the elevation 25 and corresponding regions of the jointing surface 6 in the contact zone 7, so that at least one annular, materially-bonded connection is produced. Any excess melt can flow into the groove 26. As a result, a precise and planarly orientated connection is achieved, which can be produced quickly and also enables a further area reduction.

Instead of resistance welding, the connection could also be produced by means of friction welding, induction soldering or laser welding.

Surrounding regions of the support 4 or the housing 1 are generally not impaired by the welding.

Analogously, in the case of an acceleration sensor for measuring accelerations in three axes, the other two sensor elements 2 are arranged in the housing 1, wherein the housing 1 is correspondingly newly fixed in the apparatus.

The measuring electronics 28 can also be arranged on the support 4 or on the head part 21. After introducing the sensor elements 2, the same are wired with the measuring electronics 28 and also a plug, which is not illustrated. The plug sits on a lid 29, which covers the sensor element 2 and support 4.

The housing 1 of the acceleration sensor according to the invention with the internal supports 4, preferably consists of a titanium or aluminium material, whilst the base body 20 of the sensor element 2 preferably consists of titanium or steel.

The wire for the plug is pulled through the plug opening, the lid 29 is preferably clicked in subsequently, the wire is connected to the plug and finally the plug is joined to the lid opening.

LIST OF REFERENCE NUMBERS

1 Housing
2 Sensor element
3 Installation thread
4 Support
5 Welding electrode
6 Jointing surface
7 Contact zone 20 Base body
21 Head part
22 Seismic mass
23 Piezoelectric measuring element
24 End surface
25 Elevation
26 Groove
27 Clamping ring
28 Measuring electronics
29 Lid

The invention claimed is:

1. A method for producing an acceleration sensor for use in machines, systems, vehicles or aircraft, wherein the acceleration sensor comprises a housing defining an outer shell having an interior surrounded by an exterior, which is cylindrical or cubic in terms of its basic exterior shape, the housing further defining at least one internal support, the acceleration sensor including at least one sensor element arranged on the at least one internal support, the at least one sensor element including at least one piezoelectric measuring element and a base body having a head part and an end face opposite the head part, the end face defining an annular elevation surrounded by a groove, each of the at least one internal support and the at least one sensor element being disposed within the interior of the outer shell of the housing, the method comprising;
  a) pre-installing the at least one sensor element by encompassing the head part of the base body with the at least one piezoelectric measuring element, and enclosing the sensor element with a seismic mass and a clamping ring,
  b) forming a contact zone between the end face and the at least one internal support by positioning only the annular elevation of the end face in contact with the at least one internal support in the interior of the outer shell of the housing, and
  c) constructing a materially-bonded connection at the contact zone by welding the end face on the at least one internal support.

2. The method according to claim 1, wherein the welding comes about by resistance welding, in that a welding electrode is contacted with the head part of the at least one sensor element and a counter electrode is contacted on the housing, and subsequently a defined voltage for generating a current flow between the welding electrode, the at least one sensor element, the housing and the counter electrode is applied for constructing the materially-bonded connection at the contact zone.

3. The method according to claim 2, wherein the welding electrode for the resistance welding is applied onto the head part of the at least one sensor element with a defined force.

4. The method according to claim 1, wherein the welding comes about by friction welding.

5. The method according to claim 1, further comprising the step of attaching measuring electronics on the at least one internal support or on the head part.

6. The method according to claim 1, wherein the at least one internal support and two additional supports are provided in the housing and each of the at least one internal support and the two additional supports is respectively connected in a materially-bonded manner to one of a plurality of sensor elements that includes the at least one sensor element.

7. The method according to claim 1, further comprising the steps of: subsequently to the method step c), closing the housing above the at least one sensor element with respect to the outside and contacting the at least one piezoelectric measuring element using a connector plug.

8. The method according to claim 1, wherein in step b), the contact zone is formed by contacting a jointing surface on the at least one internal support with tips of the annular elevation of the end face of the base body of the at least one sensor element.

9. The method according to claim 1, wherein the annular elevation is at least partially melting in the contact zone during the welding step.

10. An acceleration sensor for measuring acceleration values in one or three axes, wherein the acceleration sensor comprises:
  a housing defining an outer shell having an interior surrounded by an exterior, which is cylindrical or cubic in terms of its basic exterior shape, the housing further defining a plurality of internal supports disposed within the interior of the outer shell of the housing;
  a plurality of sensor elements, wherein each of the plurality of sensor elements is arranged on a respective one of the plurality of internal supports, each of the plurality of sensor elements including a base body having a head part and an end face opposite the head part, the end face defining an annular elevation surrounded by a groove, each of the plurality of internal supports and the plurality of sensor elements being disposed within the interior of the outer shell of the housing, each of the plurality of sensor elements including at least one piezoelectric measuring element encompassing the head part of the base body;
  each of the plurality of sensor elements including a respective seismic mass and a respective clamping ring enclosing said each of the plurality of sensor elements;
  wherein, for each of the plurality of sensor elements, by positioning only the annular elevation of the end face in contact with the respective one of the plurality of internal supports in the interior of the outer shell of the housing, a contact zone is formed between the end face and the respective one of the plurality of internal supports;
  wherein each end face is welded at each contact zone on each of the plurality of internal supports to form a materially-bonded connection.

11. The acceleration sensor according to claim 10, wherein the housing consists of a titanium material or an aluminium material.

12. The acceleration sensor according to claim 10 wherein the base bodies of the plurality of sensor elements consist of titanium or steel.

13. The acceleration sensor according to claim 10, wherein each of the plurality of sensor elements is configured in a pin-shaped manner, in that each of the plurality of sensor elements has an axis transverse to the end face and the end face is axially spaced from the at least one piezoelectric measuring element and also from the respective seismic mass and the respective clamping ring.

* * * * *